United States Patent [19]
Strauff

[11] 3,990,350
[45] Nov. 9, 1976

[54] SERVO STEERING SYSTEM FOR MOTOR VEHICLES

[75] Inventor: Günther Strauff, Kaarst, Germany

[73] Assignee: Langen & Co., Duesseldorf, Germany

[22] Filed: May 20, 1974

[21] Appl. No.: 471,699

[30] Foreign Application Priority Data
May 30, 1973 Germany............................ 2327535

[52] U.S. Cl.................................... 91/372; 91/380; 91/465
[51] Int. Cl.²........................................... F15B 9/10
[58] Field of Search ............. 91/380, 465, 434, 370, 91/371, 372, 373

[56] References Cited
UNITED STATES PATENTS

| | | | |
|---|---|---|---|
| 3,010,335 | 11/1961 | Foerster et al......................... | 91/380 |
| 3,722,369 | 3/1973 | Maekawa et al...................... | 91/465 |
| 3,772,962 | 11/1973 | Suzuki ................................. | 91/370 |

*Primary Examiner*—Paul E. Maslousky
*Attorney, Agent, or Firm*—Holman & Stern

[57] ABSTRACT

A steering worm shaft in operational connection with a steering wheel and communicating with an axially slidably arranged steering gear nut, which gear nut affects an additional gear member, for example, by means of a toothing, and simultaneously functions as a servo-piston or is at least fixedly connected to a servo-piston within a housing, which contains a cylinder space; the servo piston dividing a cylinder space into two operational spaces, which are separated from each other, and the steering gear nut at its outer cover is provided with an outwardly extending, axially directed lever in an area remote from the sealing area of the servo-piston; the axial width of the lever corresponding at least with the lift of the servo-piston and engaging an axial-parallel groove in the housing to allow the lever to perform a minute tilting movement relative to the housing when the steering gear nut, due to friction and rise of the worm gear nut during a rotation of the steering worm shaft, is also set into rotation, whereby the tilting movements activate at least one valve member, which is arranged in the housing vertical to the axial direction, serves in such a manner so that the inflow of pressure to, or the outflow of pressure from, the operational spaces is controlled in such a manner so that the movements of the steering gear nut are supported in that axial direction, which are initiated by the steering worm shaft.

8 Claims, 4 Drawing Figures

SERVO STEERING SYSTEM FOR MOTOR VEHICLES

BACKGROUND OF THE INVENTION

1. Field of the Invention

The instant invention concerns servo steering systems for motor vehicles.

2. Background of the Prior Art

This general type of servo steering system is known in German Patent 1,025,281; here, the valve member is constructed as a single-piece control piston having a section which communicates with the groove, having an annular groove within said section; the lever communicates with the annular groove. Since the groove, as well as the annular groove, communicate with one of the operational spaces, the full operational pressure is able to develop therein. For this reason, it was necessary in the prior art to construct the control piston in a single piece in the described manner, whereby a pressure-equalization takes place at the communicating point of the lever, namely, in the annular groove, which thereby prevents the development of pressure-forces in the axial direction. The arrangement of two control pistons, which has already been successfully utilized in other cases, wherein said control pistons are activated, for example, only after a lost motion, or via spring-elastic transmission means, was impossible in prior art, since the pressure in the operational spaces places a stress on the front side of the control pistons which would thereby be pushed apart in an undesired manner, and this would render such an arrangement as non-functional.

SUMMARY OF THE INVENTION

It is thus the scope of the instant invention to construct a servo steering system of the above-mentioned type providing servo assistance which is simple, inexpensive and functionally safe so that two control pistons can be arranged and operated with the aid of a lever. The arrangement is additionally useable for servo-steering systems having an "open center" as well as for systems having a "closed center".

The novel solution of this problem is obtained so that the lever affects an auxiliary piston which is arranged vertically to the axis of the steering gear nut, whereby the front sides of the auxiliary piston are in operational communication with two control pistons which are in coaxial arrangement to the auxiliary piston, and provided with two sections which are positioned at both sides of the communicating point of the lever, whereby said sections separate those sides of the control pistons from the groove which faces the auxiliary piston.

In an advantageous manner, the spaces, which develop between the auxiliary piston and control piston, are almost pressureless and are connected with an outflow pipe. The auxiliary piston may thereby be provided with an axial borehole so that only one of the spaces has to be connected to an outflow pipe.

In a preferred embodiment, the entire outflow of pressure takes place through these spaces. The auxiliary piston affects the control pistons by means of springs, whereby the control pistons, in a known manner, are provided with reaction chambers which are stressed by the respective pressure of the inherent operating space to a full level or up to a predetermined value against the operational force. The control pistons are suitably arranged in axially fixed control sleeves which have an outside diameter, identical to that of the auxiliary pistons.

The auxiliary piston may be spring-centered, whereby the centering should be performed by means of a prestressed spring. A dual-functioning spiral spring offers itself as the spring-means, and comprises a coil, running transverse to the direction of the axis of the auxiliary piston, with planes being vertical to the direction of the axis, and with their ends being arranged at axial distances, whereby the spiral spring is arranged in the housing in a slot which runs transverse to the direction of the axis in such a fashion so that the ends communicate with the walls of the slot and engage an annular groove having the identical expansion as the slot, and abutting there the walls as long as the operational force does not exceed a pre-determined value.

The instant invention will be more apparent when considered in detail with the following description when considered with the drawing, wherein:

DESCRIPTION OF THE PREFERRED EMBODIMENTS

Figure 1:
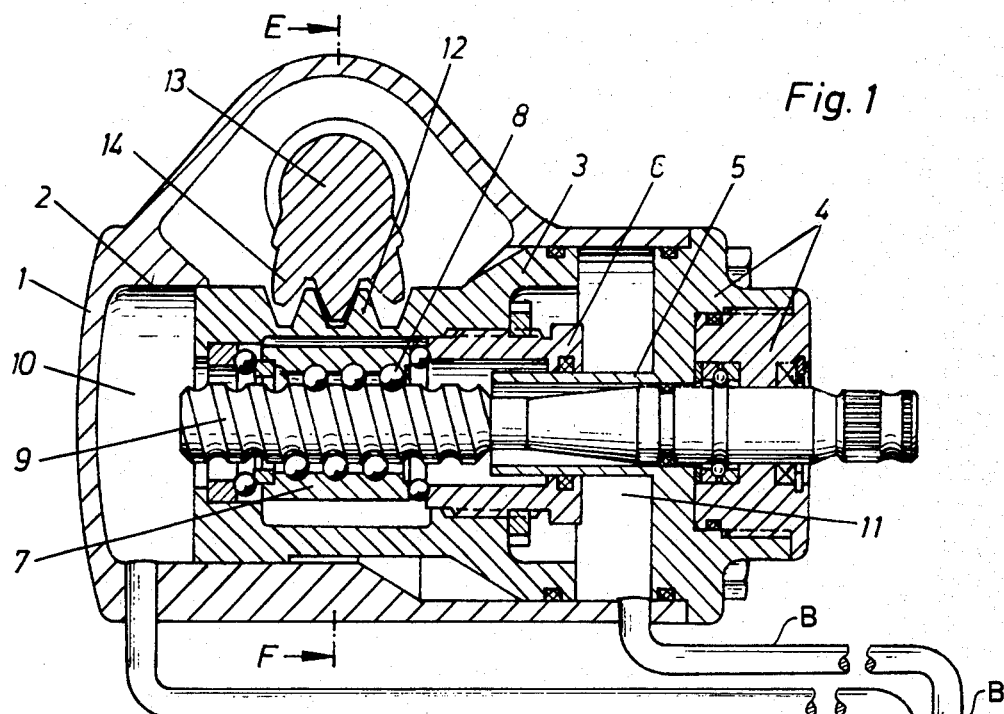
FIG. 1 is a cross section through a servo-steering unit of a servo-steering system along the longitudinal axis of the steering worm shaft and normal to the axis of the drive-off gear member.

A housing 1 has arranged therein a cylinder space 2, in which a servo-piston 3 is slidably arranged and whereby said servo piston 3 is in the form of a sequencing piston. The cylinder space 2 is sealed off at one end by means of a closure assembly 4 which is provided with a cylindrical extension 5 extending into the cylinder space 2; the cylindrical extension 5 is peripherally sealed where it projects axially through sleeve 6, which serves to axially fix a steering, driving or gear nut 7 which is disposed within the servo piston 3.

A steering worm shaft 9 engages the steering gear nut 7 by means of spherical balls 8 disposed between the worm and nut. The steering worm shaft 9 is suitably peripherally sealed and extends outwardly through a central sleeve in the extension 5 and closure assembly 4 and is connected to a steering wheel shaft (not shown). The servo piston 3 divides the cylinder space 2 into a forward, variable-volume operating space 10 and into a rear, variable-volume operating space 11 which extends annularly about extension 5; the effective areas of the operating spaces 10 and 11 are preferably equal and respectively connected to fluid conduits A and B.

The servo piston 3 is provided with an outer, intermediate area providing a gear rack 12 which meshes with and operates a toothed segment 14 formed on an output shaft 13.

The driving gear nut 7 is formed with an integral lever 15 which extends substantially normal for the axial direction of the driving gear nut 7. The lever 15 projects through the servo piston 3 by means of a suitable clearance (not shown).

Figure 2:
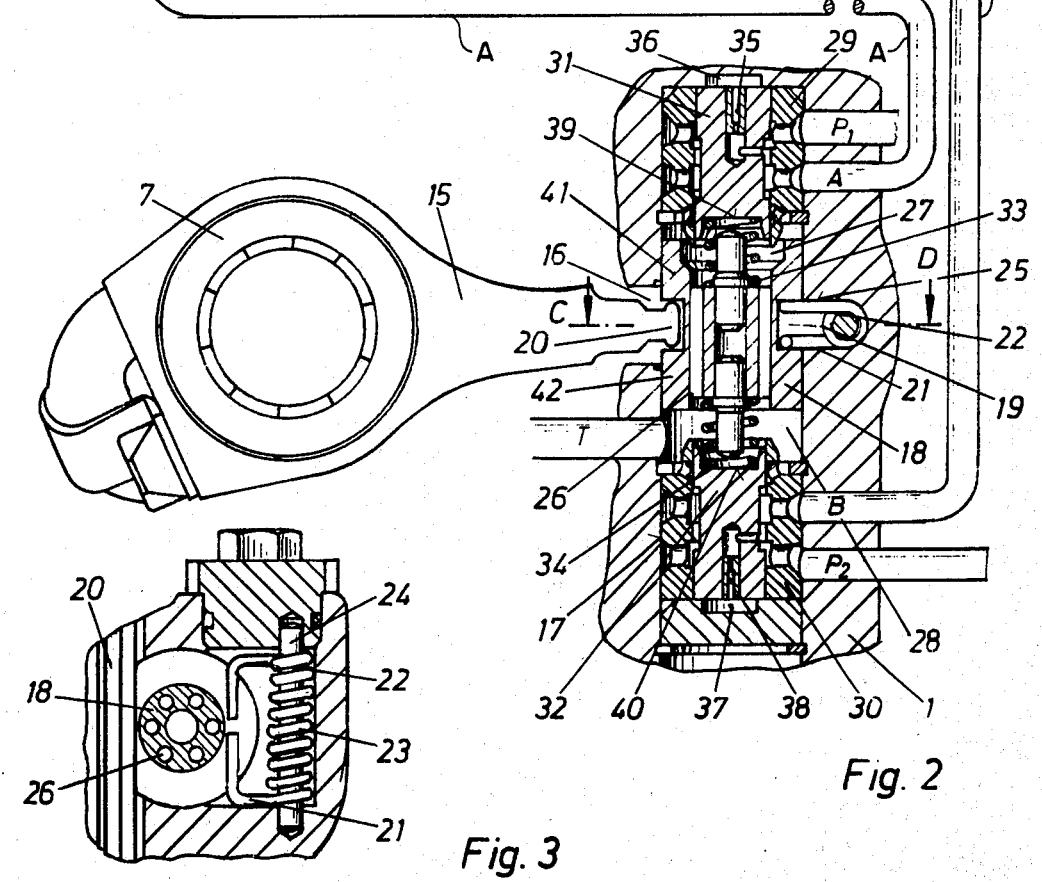
FIG. 2 is a transverse section taken on line E–F of FIG. 1.
Figure 3:
FIG. 3 is a fragmentary cross section taken on line C–D of FIG. 2.

As seen in FIG. 2, the lever 15 is provided with an extension which is axially directed and corresponds approximately with the lift of the servo piston 3. The free end of the lever 15 extends into an axially directed groove 16 in the housing 1. The groove 16 is provided with an expanse which, when viewed in the direction of movement of the lever 15, is somewhat greater than the lever extension. A cylindrical bore 17 communicates with the groove 16 in a direction which is transverse to the axial direction of the steering gear nut 7. An auxiliary piston 18 is arranged in bore 17 in the area of the groove 16. An annular slot 19 is formed in the auxiliary piston 18, into which connects the free end 20 of lever 15, without any lostmotion or play. Further, end sections 21 and 22 of a dual-effective coil-spring engage in the slot 19. The coil spring comprises a central coil 23 connected to the ends 21 and 22; the coil being retained in a pin 24 within a slotted portion 25 in the housing 1. Viewed in the axial direction of the auxiliary piston 18, the slot 25 has the same width as the annular slot or groove 19. Axially directed bores 26 connect axially spaced areas 27 and 28 at opposite ends of the auxiliary piston 18. Adjacent to the areas 27 and 28 are control sleeves 29 and 30 which are axially fixed in the bore 17. A control piston 31 slides into the control sleeve 29, while a control piston 32 slides in the control sleeve 30. The auxiliary piston 18 affects the control piston 31 through a coil spring 33, and affects the control piston 32 through a coil spring 34. Thhe control pistons 31 and 32 are a three-way valve-control-piston type. The control piston 31 is therefore able, depending on the position, to connect a conduit A, which is connected with the variable-volume operating area 10, with either a pressure-connection $P_1$ or, however, with the space 27, which in turn communicates through the bore holes 26 with the area 28 which is connected to an outflow pipe T. Correspondingly, the control piston 32 effects, depending on its position, communication to a conduit B, which is connected with the variable-volume space 11, through a pressure-connection $P_2$ or with the area 28 or the outflow pipe T. A reaction chamber 36, adjacent the end of the control piston 31, is continuously connected with conduit A by means of a throttling channel which is located inside the control piston 31.

Analogous thereto, a reaction chamber 37 is adjacent the end of the control piston 32, and is continuously connected with conduit B by means of a throttling channel 38 which is located inside the control piston 32. The inner ends of the control pistons 31 and 32, which are stressed by the springs 33 and 34, are indicated by numerals 39 and 40, respectively. The sections of the auxiliary pistons 18, which are bilateral to the groove 16, are indicated with numbers 41 and 42.

OPERATION

Figure 4:
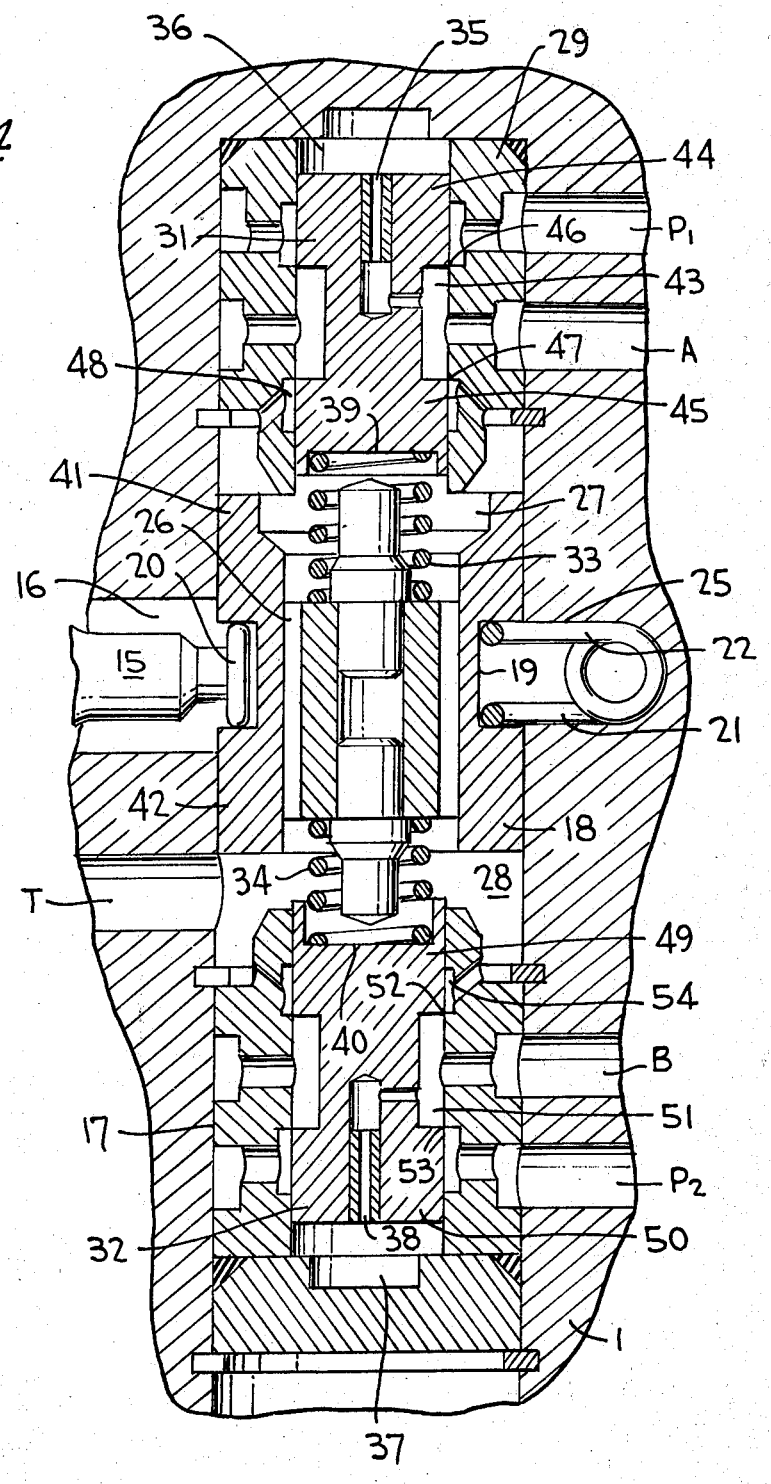
FIG. 4 is an enlarged cross section similar to the right hand portion of FIG. 2 for the purpose of illustrating the structure in clearer detail.

Referring to FIG. 4, the control piston 31 is provided bilaterally of an annular groove 43 with shoulders 44 and 45 with their edges facing the annular groove 43 and functioning as control edges 46 and 47. The axial width of the annular groove 43 is such so that the control edges 46 and 47, in a neutral position, separate conduit A from connection $P_1$ as well as from an annular groove 48, which communicates with outlet T. The throttle channel 35 terminates in the area of the annular groove 43 and is therewith, as already mentioned above, always connected with the connection A. In a corresponding fashion, the control piston 32 is provided with two shoulders 49 and 50 which are separated by means of an annular groove 51. The edges of shoulders 49 and 50 facing the annular groove 51, serve as control edged 52 and 53. Their distance from each other is such so that in a neutral position of the control piston 32 they separate the annular groove 51 and therewith the connection B from connection $P_2$ as well as from an annular groove 54, which is in communication with the space 28 and subsequently also with the connection T. The throttle channel 38 terminates in the area of the annular groove 51 and is therewith permanently connected with connection B.

For the purpose of explaining the function, it first is assumed that according to FIG. 2 and 4, in the pressure connections $P_1$ and $P_2$, there prevails a pressureless condition. The control pistons 31 and 32, in such a condition, would be displaced by the force of springs 33 and 34 to an extent until they abut on housing 1. In such a position, the control edge 46 will produce communication between the pressure connection $P_1$ and the annular groove 43 or the connection A, while the control edge 47 blocks communication from the annular groove 43 to annular groove 48. There develops then, simultaneously at the control edge 53, communication from the pressure condition $P_2$ to the annular groove 51 and thereby to connection B, while the annular groove 51 is simultaneous separated from the annular groove 54.

Now the pressure connections $P_1$ and $P_2$ are pressurized, then the pressure flows via the connection $P_1$-A into the working space 10 and via connection $P_2$-B into the working space 11. Since the working spaced 10 and 11 have operational areas which are of a generally identical size, the servo piston 3 will remain in stable equilibrium. The pressure is directed from the annular grooves 43 and 51 via the throttle bores 35 and 38 into the reaction chambers 36 and 37. The pressure increase which thereby develops in said reaction chambers pushes the control pistons 31 and 32 against the respective forces of springs 33 and 34 to a point where the control edges 46 and 52 will substantially close or seal the connections $P_1$-A or $P_2$-B, the expression "seal up" does not mean a hermetically tight seal but this is a pressure regulation closure, in which as much pressure flow continues from connection $P_1$ to connection A, or from connection $P_2$ to connection B as the amount of pressure which leaks from the connections A and B to outlet T. The pressure which thereby develops in the reaction chambers 36 and 37 depends on the stress of springs 33 and 34, and remains substantially constant without any outside influence, for example, at a value of from 3 to 5 bar (atmospheres), and prevails in general also in the working spaces 10 and 11; this pressure can also be termed as residual or initial pressure. It should be pointed out that during these preliminary pressurizing functions, the auxiliary piston 18 will initially not move since the initial stress of the spring sections 21 and 22 of the coil spring 23 is stronger than the force of the spring 33 and 34.

It can now further be assumed that the steering worm shaft 9 in FIG. 1 is turned clockwise; this movement is transmitted to the steering gear nut 7 which then attempts to also move in clockwise direction (it will be observed that during this clockwise movement, due to the direction that section E–F is taken to produce FIG. 2, the steering geat nut 7 in FIG. 2 rotates counterclockwise). A rotation of the steering gear nut 7 and therewith of lever 15, however, is only possible, when the force of lever 15, which is transmitted by means of its free end 20 to the auxiliary piston 18, is sufficient to overcome springs 21 and 22.

It may be assumed initially that the force would not be sufficient, as may be the case, for example, during fast driving speeds or under icy road conditions due to the low power-assisted steering. In this case, the steering nut 7 is unable to follow the turning of the steering worm shaft 9, there results an axially directed movement of the steering nut 7, and therewith of the servo piston 3. The servo piston 3 moves thereby in a manner so that the working space 11 is reduced and pressure flow is forced from the working space 11 to connection B. This will cause a minor pressure increase to develop on connection B, which communicates via annular groove 51 and the throttle bore 38 to the reaction chamber 37, and effects therein a movement of the control piston 32 against the force of spring 34. The movement continues until the control edge 52 of piston 32 has opened a sufficient flow between the annular grooves 51 and 54, i.e., in other words, until the connection B-T is produced. On the other side, the working space 10 enlarges and thereby causes a minor pressure reduction, which extends to the connection A and from there into the reaction chamber 36. The spring 33 is therefore in the position to move the control piston 31 to such an extent until the control edge 46 has produced a sufficient flow between the connection $P_1$-A. The expression "sufficient" means that a crosscut is opened which is necessary to again produce the initial stress on connection A. Rotation of the steering worm shaft 9 counter-clockwise would effect the identical procedures respectively for the other control piston or the other working space, so that there is no detailed description necessary at this point.

It may now be assumed that for the purpose of activating the vehicle wheels, for example, during parking, there is required comparatively high power assistance. The steering nut 7 will then no longer be in the position to move the servo piston 3 and to turn the output shaft 13. The steering nut 7 will therefore rotate by a small amount synchronously with the steering worm shaft 9 and will transmit this movement to the lever 15 which lever in turn moves the auxiliary piston 18 upwards in FIGS. 2 and 4, overcoming the initial stress of the spring section 21, whereby the spring section 22, without effort, retains its position. Due to the upwards-movement of auxiliary piston 18, the spring 33 is stressed somewhat more, and moves the control piston 31 into a position during which the control edge 46 opens the connection $P_1$-A. Pressure flows from pressure connection $P_1$ via connection A to working space 10 and affects there, to an extended degree, the auxiliary piston 18 and a minor release of spring 34. This means that the control piston 32 is moved into a position in which a communication is produced from connection B to the annular groove 54 by means of the control edge 52 through which pressure flows from working space 11 to outlet means T. The amount of pressure in reaction chamber 36 and hence at connection A, and in working space 10, depends on the initial stress of spring 33. The more the spring 33 is stressed by compensating the auxiliary piston 18, the higher will be the pressure. The force affecting the output shaft 13 comprises therefore two components, namely, first the pressure exert in the working space 10 on the servo piston 3, and second the mechanical force which corresponds to the stress of the spring section 21. It is apparent, that the stress of the spring 33 or the stress which is effected by means of the pressure in the reaction chamber 36 via the auxiliary piston 18, the lever 15 and the control nut 7, in addition to the force serving to rebalance the spring section 21, is reflected as reaction force to the steering worm shaft 9 and therewith to the driver of the vehicle. Also in this case, a counter-clockwise turning of the steering worm, shaft 9 effects the identical processes respectively for the other control piston or the other working space.

In summary, the case should be noted wherein when no outside force affects the steering worm shaft 9, the steered vehicle wheels which are in operational communication with the output shaft 13, should automatically return into a straight forward position. In this case, the servo piston 3 is activated by means of the output shaft 13. Under the assumption in this case, that a movement is made in a manner so that the working space 11 is reduced, the resultant lower pressure increase effects on connection B also a pressure increase in reaction chamber 37, as a result of which the control edge 51 opens the connection B-T.

In the reverse, the enlargement of the working space 10 effects a minor pressure decrease also in reaction chamber 36, whereby the spring 33 moves the control piston into a position which produces a connection $P_1$-A. Pressure is then able to flow into the working space 10 without, however, to produce therein a pressure which is higher than the initial pressure. The initial stress of the spring sections 21 and 22 is not overcome during these operations.

Rotation of the control worm shaft in the opposite direction effects the similar functional procedure, whereby the control pistons are switched. It is clearly apparent that the pressure in the axial groove 16, which, in general, is in relation to the pressure in operating space 10, is unable to continue to flow into the chambers 27 and 28. This is effected by means of part 41 and part 42 of the auxiliary piston 18 which seal the groove 16 towards the chambers 27 and 28. Notwithstanding smaller frictional- and flow-forces, only the forces of the springs 33 and 34 or the pressures in the reaction chambers 36 and 37 will affect the control pistons 31 and 32.

The scope of the instant invention is not limited to the illustrated embodiments. Eventhough the drawings illustrate control pistons with a "closed center", it is very possible to utilize also control pistons having an "open center".

What is claimed is:

1. In a fluid pressure-operated servo steering system for motor vehicles comprising, in combination, a housing (1); a steering worm (9) including a shaft for connection to steering means for rotating the shaft; said steering worm (9) extending into the housing (1); an axially-displaceable steering gear nut (7) received on said steering worm (9) for axial movement thereby in response to steering worm rotation; said steering gear nut (7) being arranged in a servo-piston (3) and being rotatable but not axially displacable in relation to said servo-piston (3); said servo-piston (3) being with the gear nut (7) as a unit axially displacable with a certain stroke in said housing (1) in a fluid tight manner defining opposed fluid pressure operating spaces (10, 11) within said housing (1); output shaft means (13) operatively connected to said servo-piston (3) for movement due to axial movement of the servo-piston (3), said output shaft comprising means (13) for connection to steerable wheels; a lever (15) operatively connected to said steering gear nut (7) and having, an axial direction a width substantially corresponding to the stroke of the servo-piston (3); an axial-parallel groove (16) in the housing (1) engaged by the lever (15) and allowing the lever (15) to perform minute tilting movements in relation to the housing (1) during rotation of the steering worm shaft (9); a bore (17) in the housing (1) communicating with said groove (16), said bore (17) being substantially transverse to the direction towards which said lever (15) projects; valve means (18, 31, 32) in said bore operatively connected to said lever (15) for controlling a pressure fluid flow from a pressure source (P) to the operating spaces (10, 11) and from the operating spaces (10, 11) to an outflow conduit means (T) in response to the tilting movements of the lever (15) in such a manner so that the movements of the servo-piston (3) are supported in those axial directions which are initiated by the steering worm shaft (9) via the steering gear nut (7); reaction chambers (36, 37) at the valve means communicating with the respective operating spaces (10, 11) to reflect reaction forces to the lever (15), the forces being proportional to the pressures arising in the operating spaces (10, 11) so as to create "feel" in the steering system; the improvement in which the valve means includes an auxiliary piston (18) operatively connected to said lever (15) and two control pistons (31, 32) of a three-way-three-position-type at opposite ends of the auxiliary piston (18), said control pistons (31, 32) are operatively connected to the auxiliary piston (18) via spring means (33, 34) arranged in spaces (27, 28) formed between the opposite ends of the auxiliary piston (18) and the respective control pistons (31, 32), said auxiliary piston (18) including bilateral sections (41, 42) at the point of connection with the lever (15), said bilateral sections (41, 42) separating inner faces (39, 40) of the control pistons (31, 32) axially facing the auxiliary piston (18) from the groove (16), the reaction chambers (36, 37) are arranged in the bore (17) of the housing, adjacent to ends of the control pistons (31, 32) which are opposite the spring means (33, 34).

2. The servo-steering system as claimed in claim 1, in which the spaces (27, 28) formed between the auxiliary piston (18) and said control pistons (31, 32) are connected to the outlet conduit means (T) so that pressure developed in the spaces (27, 28) is substantially negligible.

3. The servo-steering system as claimed in claim 2, in which said auxiliary piston (18) includes at least one axially directed through bore (26) connecting the spaces (27, 28) between the auxiliary piston (18) and the control pistons (31, 32), only one (28) of said spaces being connected to the outlet conduit means (T).

4. The servo-steering system as claimed in claim 3, in which each of said control piston (31, 32) is formed to connect in one of the three positions, the respective operating space (10, 11) with the respective spaces (27, 28) between the auxiliary piston (18) and the respective control pistons (31, 32) so that the entire outflow of pressure fluid to the outlet conduit means (T) will be accommodated through said spaces (27, 28).

5. The servo-steering system as claimed in claim 1, in which the control pistons (31, 32) are reciprocatingly disposed in control sleeves (29, 30) fixed in the bore (17) at opposite ends and having an outer cross-section corresponding to that of the auxiliary piston (18).

6. The servo-steering system as claimed in claim 1 including resilient elements (21, 22, 23) operatively connected between the housing (1) and the auxiliary piston (18) for centering the auxiliary piston (18) in the bore (17).

7. The servo-steering system as claimed in claim 5, in which the resilient elements (21, 22, 23) comprise prestressed portions.

8. The servo-steering system as claimed in claim 6, in which said resilient elements (21, 22, 23) comprise a coil spring extending transversely of the longitudinal axis of the auxiliary piston (18) and its direction of movement, said coil spring including operative end portions (21, 22) disposed in a plane normal to the longitudinal axis of the auxiliary piston (18), the housing (1) including a slot (25) communicating with said bore (17) and in which the coil portion (23) of the coil spring is disposed, the operative end portions (21, 22) being biased outwardly into engagement with respective opposite sides of the slot (25), the auxiliary piston (18) including an annular slot (19) into which the operative end portions (21, 22) project for maintaining the auxiliary piston (18) centered so long as the actuating force transmitted through the lever (15) does not exceed a predetermined limit.

* * * * *